United States Patent
Nazzaro et al.

(10) Patent No.: US 11,172,085 B2
(45) Date of Patent: Nov. 9, 2021

(54) MFD WORKFLOW TEMPLATE WITH MULTIPLE RESOLUTIONS

(71) Applicant: Xerox Corporation, Norwalk, CT (US)

(72) Inventors: Cheryl A. Nazzaro, Fairport, NY (US); Sanja Pstrocki-Porras, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/811,888

(22) Filed: Mar. 6, 2020

(65) Prior Publication Data

US 2021/0281692 A1    Sep. 9, 2021

(51) Int. Cl.
*H04N 1/00* (2006.01)
*H04N 1/04* (2006.01)

(52) U.S. Cl.
CPC ..... *H04N 1/00482* (2013.01); *H04N 1/00413* (2013.01); *H04N 1/042* (2013.01); *H04N 1/00403* (2013.01); *H04N 1/00411* (2013.01)

(58) Field of Classification Search
CPC ............... H04N 1/00482; H04N 1/042; H04N 1/00413; H04N 1/00403
USPC ................................................ 358/496, 1.12
See application file for complete search history.

(56) References Cited

U.S. PATENT DOCUMENTS

| | | | |
|---|---|---|---|
| 7,010,176 B2* | 3/2006 | Kusunoki | H04N 1/00132 358/1.18 |
| 2003/0071897 A1* | 4/2003 | Brett | H04N 5/253 348/97 |
| 2006/0039609 A1* | 2/2006 | Takano | G06K 15/00 382/190 |
| 2006/0291015 A1 | 12/2006 | Yeoh et al. | |
| 2014/0351817 A1* | 11/2014 | Sawamura | H04N 1/00244 718/102 |
| 2020/0280654 A1* | 9/2020 | Achiwa | G06N 3/08 |

* cited by examiner

*Primary Examiner* — Miya J Williams
*Assistant Examiner* — Darryl V Dottin (57) ABSTRACT

A method for scanning a document a single time on a multi-function device (MFD) to generate a scanned image in different resolutions is disclosed. For example, the method is executed by a processor of the MFD and includes receiving the document, causing a scanner to scan the document, generating a plurality of scanned documents, wherein each one of the plurality of scanned documents have different resolutions, and outputting the plurality of scanned documents.

11 Claims, 7 Drawing Sheets

MFD WORKFLOW TEMPLATE WITH MULTIPLE RESOLUTIONS

The present disclosure relates generally to multi-function devices (MFDs) and, more particularly, to generating multiple scanned resolutions for a single scan of a document and options to print in the different scanned resolutions.

BACKGROUND

Multi-function devices (MFDs) can be used to perform a variety of different functions. For example, MFDs can be used to copy documents, print documents, fax documents, and the like. Typically, a user may have a computing device that is communicatively coupled to the MFD. The user may create an image to be printed on the computing device and send the image data to the MFD to be printed. In other examples, a document may be scanned by the MFD for printing, copying, faxing, emailing, and the like.

SUMMARY

According to aspects illustrated herein, there is provided a method, non-transitory computer readable medium, and an apparatus for scanning a document a single time on a multi-function device (MFD) to generate a scanned image in different resolutions. One disclosed feature of the embodiments is a method that receives the document, causes a scanner to scan the document, generates a plurality of scanned documents, wherein each one of the plurality of scanned documents have different resolutions, and outputs the plurality of scanned documents.

Another disclosed feature of the embodiments is a non-transitory computer-readable medium having stored thereon a plurality of instructions, the plurality of instructions including instructions which, when executed by a processor, cause the processor to perform operations that receive the document, cause a scanner to scan the document, generate a plurality of scanned documents, wherein each one of the plurality of scanned documents have different resolutions, and output the plurality of scanned documents.

Another disclosed feature of the embodiments is an apparatus comprising a processor and a computer readable medium storing a plurality of instructions which, when executed by the processor, cause the processor to perform operations that receive the document, cause a scanner to scan the document, generate a plurality of scanned documents, wherein each one of the plurality of scanned documents have different resolutions, and output the plurality of scanned documents.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses workflow templates with multiple resolutions for multi-function devices (MFDs). As discussed above, MFDs can be used to perform a variety of different functions. However, MFDs can currently lack some functionality. For example, current MFDs can scan a document in a single resolution. However, if different resolutions are desired, then the document must be scanned multiple times by the MFD at the different desired resolutions.

Different scanned resolutions may be used depending on how the scanned document may be output. For example, a higher resolution may be used for printing a scanned document. A lower resolution may be used for displaying the scanned document on a monitor. Thus, with previous MFDs, a document would be run through the MFD multiple times to scan the document at the different resolutions.

The present disclosure provides a new workflow template for MFDs that can scan a document a single time to generate scanned documents of different resolutions. In other words, a document can be scanned by the MFD a single time and the MFD may create scanned images or files of the document in a plurality of different resolutions. The resolutions may be selected by the user up to a maximum scanning resolution capability of the MFD.

In addition, the scanned document can be saved locally on the MFD or remotely in the different resolutions. As a result, a user may also be able to output the scanned image at the desired resolution. In other words, the higher resolution scanned image may be used for display rather than the lower resolution scanned image. In another example, the user may print the lower resolution scanned image for faster review or lower ink usage, and the like.

Figure 1:
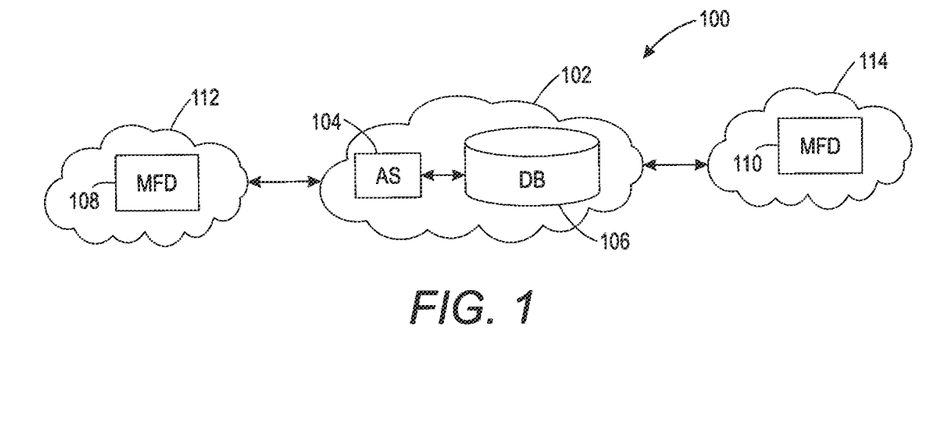
FIG. 1 illustrates a block diagram of a system of the present disclosure.

FIG. 1 illustrates an example system 100 of the present disclosure. In one embodiment, the system 100 may include a communication network 102 that includes an application server (AS) 104 and a database (DB) 106. Although the AS 104 and the DB 106 are illustrated as separate components, it should be noted that the AS 104 and the DB 106 may be deployed as a single device.

In one embodiment, the communication network 102 may be an Internet protocol (IP) network. The communication network 102 may be wide area network (e.g., across different geographic locations) or a local area network (e.g., a wireless network within a building). In one embodiment, references made to "the cloud" may refer to the communication network 102.

It should be noted that the communication network 102 has been simplified for ease of explanation. The communication network 102 may include other devices or components that are not shown. For example, the communication network 102 may include routers, switches, gateways, firewalls, and the like.

The AS 104 may be a computing device that includes a processor and memory. The AS 104 may be communicatively coupled to the DB 106. The DB 106 may include a computer readable storage medium that may store various information or data. For example, DB 106 may store user profiles, user log-in credentials, and the like. In one embodiment, the additional output functionality provided on an MFD 108 (discussed in further details below) may be stored in the AS 104 or the DB 106. When a user logs into the MFD 108 or 110, the AS 104 may distribute the additional output functionality to the MFD 108 or 110.

In one embodiment, the AS 104 and the DB 106 may be part of a printer network. The AS 104 and the DB 106 may store documents that are scanned or saved via a "print to file" operation. The additional output functionality described herein may be applied on documents stored in the "printer network" on the AS 104 and/or the DB 106 that are accessed via the MFD 108 or 110.

In one embodiment, the AS 104 may be communicatively coupled to local networks 112 and 114. The local networks 112 and 114 may be located in different geographic and/or physical locations. For example, the local network 112 may be a local network for an enterprise office in California and the local network 114 may be a local network for an enterprise office in New York. In one embodiment, an MFD 108 may be located in the local network 112 and an MFD 110 may be located in the local network 114.

Although two local networks 112 and 114 are illustrated in FIG. 1, it should be noted that any number of local networks may be communicatively coupled to the communication network 102 and the AS 104. Although a single MFD 108 or 110 is illustrated in the respective local networks 112 and 114, it should be noted that the local networks 112 and 114 may include any number of MFDs.

In one embodiment, the MFD 108 may be referred to as a "local MFD". For example, the MFD 108 may be a local MFD of a user or the MFD that a user interacts with the most. For example, the local network 112 may be where a user works daily.

Figure 2:
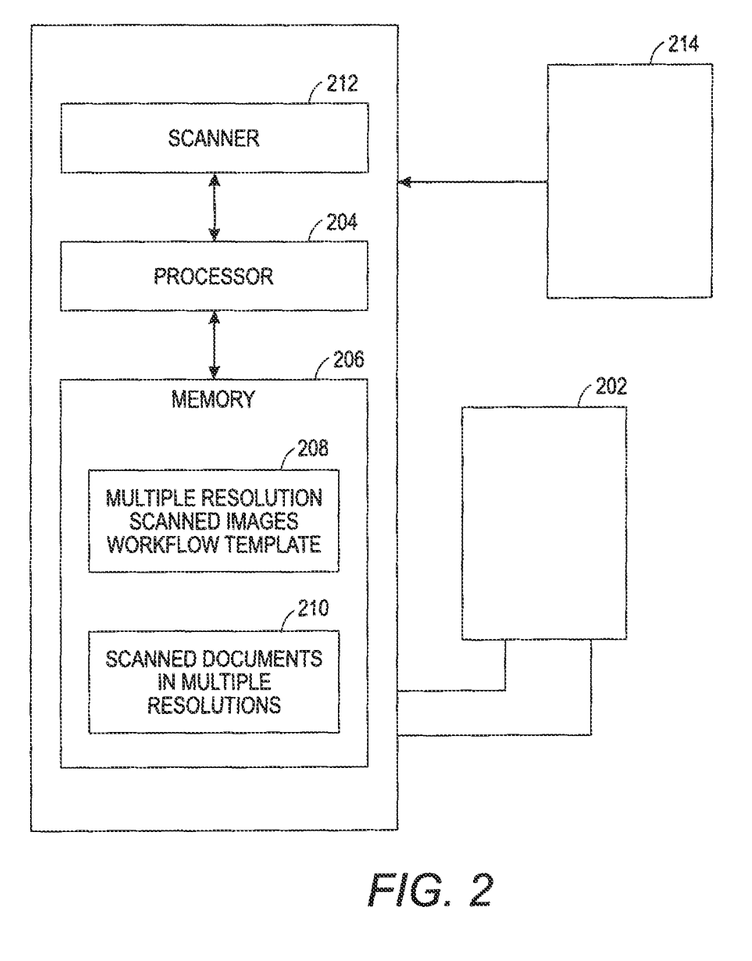
FIG. 2 illustrates a block diagram of an example MFD of the present disclosure.

FIG. 2 illustrates a block diagram of an example MFD 108 of the present disclosure. The MFD 110 may include the same components and be similar to the MFD 108 illustrated in FIG. 1. It should be noted that the MFD 108 has been simplified for ease of explanation and may include additional components that are not shown. For example, the MFD 108 may include a paper tray, a print engine, a digital front end, one or more finishing modules, communication interfaces (wired or wireless), and the like.

In one embodiment, the MFD 108 may include a display 202, processor 204, a memory 206, and a scanner 212. The display 202 may provide a graphical user interface (GUI) to allow a user to save documents to the MFD 108, allow the user to find and select saved documents on the MFD 108, provide different output functions for the selected document, and the like, discussed in further details below.

In one embodiment, the processor 204 may be communicatively coupled to the display 202, the memory 206, and the scanner 212. The processor 204 may control operation of the display 202 and the scanner 212. The processor 204 may also execute instructions stored in the memory 206.

In one embodiment, the scanner 212 may include an optical device that can scan a document 214 that is fed through the MFD 108 to the scanner 212. The optical device may scan the document 214 to generate scanned images. In one embodiment, the scanner 212 may scan the document 214 at various resolutions. In one embodiment, the scanner 212 may scan the document 214 in a single highest or maximum resolution.

In one embodiment, the document 214 may be one or more sheets of print media. For example, the document 214 may include multiple pages that can be fed through the MFD 108 via a paper tray or feed tray. The pages of the document 214 can be fed automatically to the scanner 212 one page at a time for scanning.

In one embodiment, the memory 206 may be any type of non-transitory computer readable medium. For example, the memory 206 may be a hard disk drive, a solid state drive, a read only memory, a random access memory, and the like. In one embodiment, the memory 206 may include a multiple resolution scanned images workflow template 208 (also referred to herein as workflow template 208) and scanned documents in multiple resolutions 210.

In one embodiment, the workflow template 208 may present an option on the GUI of the display 202 to allow a user to scan the document 214 a single time to generate multiple scanned images at different resolutions. In other words, each page of the document 214 can be scanned a single time to generate multiple scanned images of each page at different resolutions. For example, if the document 214 was a single page, the single page may be scanned by the scanner 212 a single time. However, the workflow template 208 may automatically generate multiple scanned images of the single page, each scanned image having a different resolution. As a result, if a user would like to have the document 214 scanned at different resolutions, the user may simply feed the document 214 into the MFD 108 and select the workflow template 208. In contrast, previous MFDs would require the user to run the document 214 through the MFD 108 multiple times to obtain scanned images at different resolutions.

In one embodiment, the scanned documents in multiple resolutions 210 may store the multiple scanned documents generated by the workflow template 208. In one embodiment, the scanned documents in multiple resolutions 210 may also be stored in DB 106. As a result, any MFD 108 or 110 that is part of the printer network may access the scanned documents in multiple resolutions 210.

In one embodiment, a user may access the scanned documents in multiple resolutions 210 from the GUI shown on the display 202, as discussed below and illustrated in FIGS. 4A and 4B. Thus, the present disclosure may also allow a user to output (e.g., display, print, transmit, email, and the like) the scanned images of the document 214 in a desired resolution.

Figure 3:
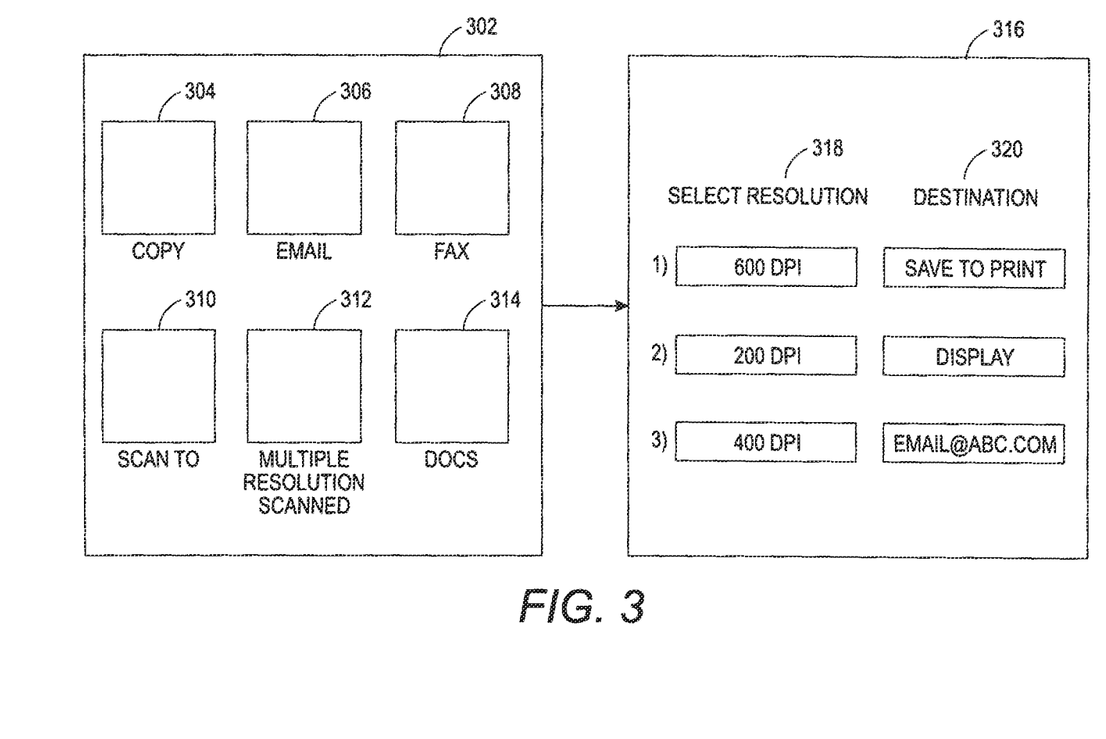
FIG. 3 illustrates an example of a screenshot for a GUI to present a workflow template to generate multiple scanned images for scanned document of the present disclosure.

FIG. 3 illustrates an example of GUIs 302 and 316 that may be shown in the display 202. In one example, the GUI 302 may display various icons 304, 306, 308, 310, 312, and 314 on a home screen of the display 202. For example, the icons 304, 306, 308, 310, 312, and 314 may illustrate different functions or workflows that can be performed by the MFD 108. For example, the icon 304 may be selected to perform a copy function, the icon 306 may be selected to perform a scan and email function, the icon 308 may be selected to perform a fax function, the icon 310 may be selected to perform a scan function at a single resolution, and so forth. It should be noted that the icons 304, 306, 308, 310, 312, and 314 are provided as examples and other icons may be shown and associated with other possible functions performed by the MFD 108.

In one embodiment, the icon 312 may be added to the GUI 302. The icon 312 may be selected to perform the multiple resolution scanning images workflow template 208 described above. For example, a user may load the document 214 into the MFD 108 and select the icon 312.

In one embodiment, the MFD 108 may automatically begin scanning the document 214 when the icon 312 is selected. For example, the multiple resolution scanning images workflow template 208 may scan in two resolutions. A highest resolution (e.g., 600 dpi, or whatever the highest resolution for the scanner 212 may be) may be for printing and a lower resolution (e.g., 200 dpi or any resolution that may be acceptable for a display) may be for display on a monitor or the display 202.

In one embodiment, the document 214 may be scanned at a highest resolution to generate a first scanned image of the document 214 at the highest resolution. The processor 204 may then convert the first scanned image of the document 214 into a second scanned image of the document 214 at a lower resolution. In other words, the second scanned image may have a lower resolution than the first scanned image.

In one embodiment, the first scanned image may be automatically stored in the memory 206 for printing and the second scanned image may be automatically displayed. In one embodiment, both the first scanned image and the second scanned image can be stored for output as specified by the user at a later time, as discussed in further details below.

In one embodiment, the conversion of the first scanned document can be performed in a variety of different ways. For example, the processor 204 may reduce the number of pixels to reduce the resolution. For example, the number of pixels that are grouped together may be based on a desired reduction of resolution. Then the gray values or pixel color values of each pixel in the group may be averaged and the average value may be assigned to a larger pixel that is formed from the combined number of pixels. However, any other available methods may be used to reduce the resolution of the first scanned image to create the second scanned image.

In one embodiment, the scanner 212 may automatically scan the document twice at different resolutions. For example, the optical device of the scanner 212 may scan the document 214 a first time at a first resolution and then scan the document 214 a second time at a second resolution. Notably, although two scans are performed by the scanner 212, the user feeds the document 214 a single time and selects a single function (e.g., the icon 312) to perform the multiple scans to generate the scanned documents with different resolutions. The scanned documents at different resolutions that are generated may be stored in the memory 206 as the scanned documents in multiple resolutions 210 illustrated in FIG. 2, and discussed above.

In one embodiment, when the icon 312 is selected, the GUI 316 may appear in the display 202. The GUI 316 may allow a user to select the desired resolution 318 and the desired destination 320. For example, document 214 may be scanned at more than two different resolutions. In addition, the user may want to view the scanned image of the document 214 on different devices that may have different screen resolutions. Thus, the user may define a particular resolution 318 for a particular device 320.

For example, the user may select a first resolution of 600 dpi for a save to print destination. Thus, the first scanned image may be stored in the memory 206 or the DB 106 in the communication network 102 for remote access. The second scanned image may be at 200 dpi for the display 202 of the MFD 108 that may be relatively small with a low resolution. The third scanned image may be at 400 dpi that can be emailed to the user for display on an external monitor with a high resolution, and so forth.

Thus, with a single operation, the document 214 may be scanned to generate scanned images at different resolutions. In some embodiments, a plurality of scanned images of the document 214 may be generated with a single scan (e.g., where the document 214 is scanned at a highest resolution and the additional scanned images at a lower resolution are generated via a software conversion).

Figure 4A:
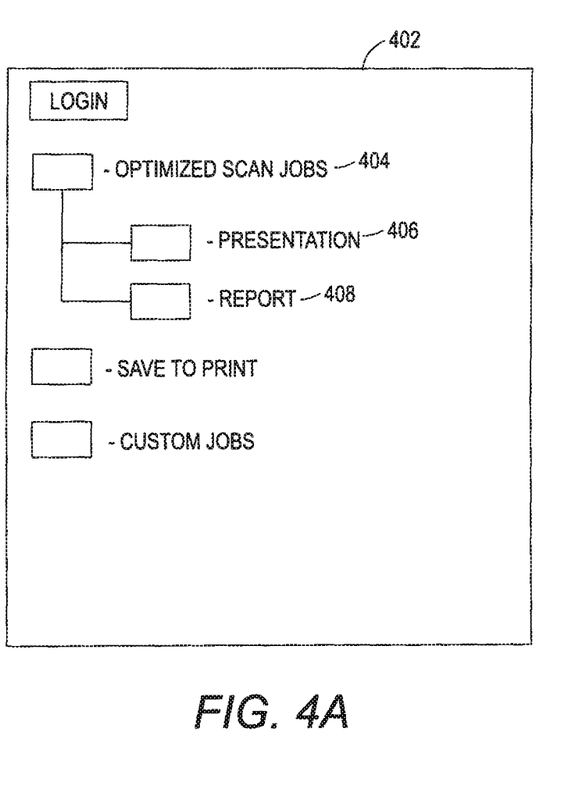
FIGS. 4A-4B illustrate examples of screenshots for a GUI to present a scanned document at different resolutions for selection to print of the present disclosure.
Figure 4B:
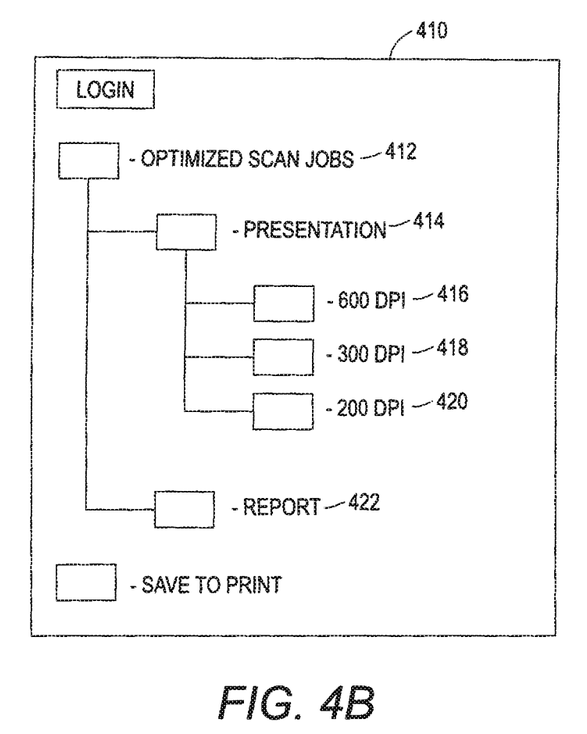

FIGS. 4A and 4B illustrate example GUIs 402 and 410 of selecting a scanned document for output or printing. The examples shown in FIGS. 4A and 4B are shown for printing. However, it should be noted that the scanned documents may also be selected to be output to a display, transmitted (e.g., via email) to another endpoint device, and the like.

In one embodiment, the GUI 402 may be displayed in response to selection of the icon 314 illustrated in FIG. 3 and discussed above. The icon 314 may display various documents that may have been saved to the memory 206.

In one embodiment, the GUI 402 may include a folder 404 that includes the different scanned images of various documents 214 that have been scanned. For example, the folder 404 may include an organized view of the scanned documents in multiple resolutions 210 stored in the memory 206. In one embodiment, the folder 404 may be labeled as "optimized scan jobs". However, it should be noted that the folder 404 may be labeled with any desired descriptor.

In one embodiment, the folder 404 may include scanned documents 406 and 408. In one embodiment, only a single icon may be shown for the scanned documents 406 and 408. Thus, when one of the scanned documents 406 and 408 are selected for printing, the MFD 108 may automatically select the scanned document in a highest resolution to be printed. In other words, a user may simply select the desired scanned document 406 or 408 rather than having to scroll through all of the scanned documents in various resolutions and trying to select the correct scanned document in the correct resolution for printing.

In one embodiment, when the icon 314 is selected, the GUI 410 may be presented on the display 202. In one embodiment, the GUI 410 may include a folder 412 that includes the scanned documents 414 and 422. However, in the GUI 410 when the scanned document 414 is selected, another directory tree of the various resolutions 416, 418, and 420 of the scanned document 414 may be displayed. Thus, a user may select the desired resolution 416, 418, or 420 of the scanned document 414 for output.

In one embodiment, the GUI 410 may allow a user to select how the selected resolution 416, 418, or 420 should be output. For example, the user may want to print the scanned document 414 at a resolution 420 for faster printing where details may not be important. In another example, the user may have a high definition monitor for a presentation and want to display the scanned document 414 in a highest resolution possible. Thus, the user may select the resolution 416 of the scanned document 414 to be emailed to a device connected to the high definition monitor.

Thus, the present disclosure also provides access to, and output of, the multiple scanned images/documents of the document 214 that is scanned. The user may access the multiple scanned images/documents locally on the MFD 108 or remotely on a remotely located MFD 110 connected to the communications network 102.

Figure 5:
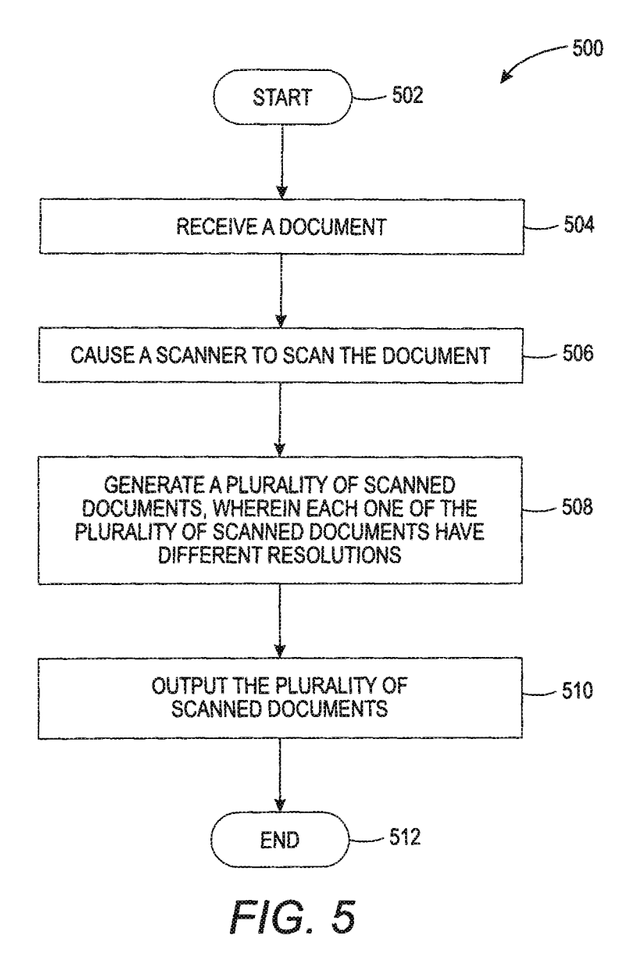
FIG. 5 illustrates a flowchart of an example method for scanning a document a single time to generate a scanned image in different resolutions of the present disclosure.
Figure 6:
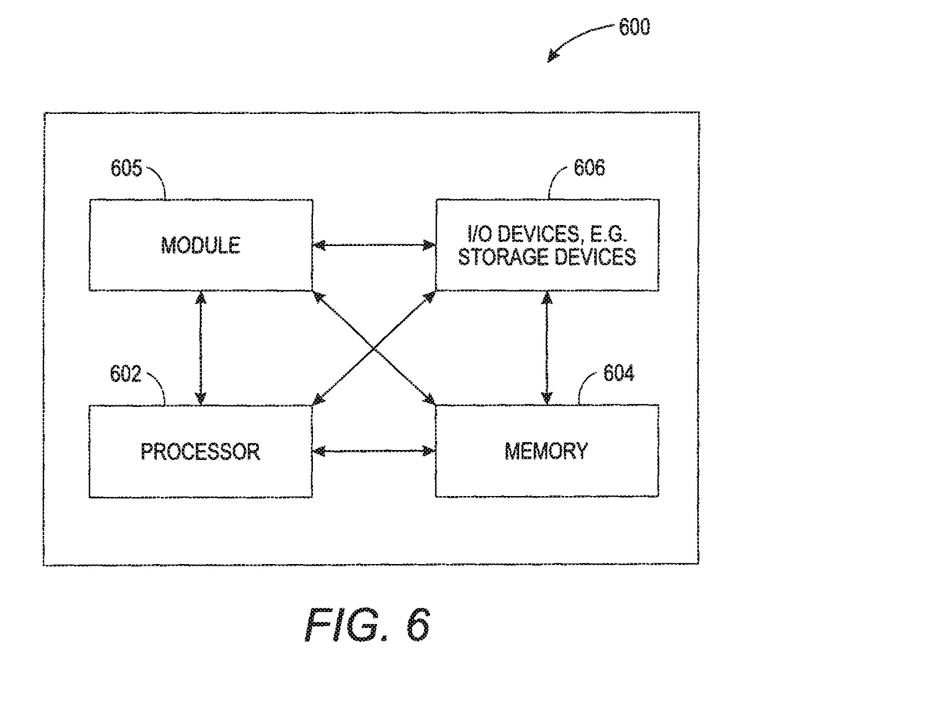
FIG. 6 illustrates a high-level block diagram of an example computer suitable for use in performing the functions described herein.

FIG. 5 illustrates a flowchart of an example method 500 for scanning a document a single time to generate a scanned image in different resolutions of the present disclosure. In one embodiment, one or more blocks of the method 500 may be performed by the MFD 108, or a computer/processor that controls operation of an MFD as illustrated in FIG. 6 and discussed below.

At block 502, the method 500 begins. At block 504, the method 500 receives the document. For example, the document may have one or more pages and be placed in a feeder tray of the MFD. A user may select an icon or workflow template to automatically generate multiple scanned documents at different resolutions. In response to the selection, the document may be fed to an MFD one page at a time.

At block 506, the method 500 causes a scanner to scan the document. In one embodiment, the scanner may scan each page of the document as the MFD feeds the pages of the document through the scanner.

At block 508, the method 500 generates a plurality of scanned documents, wherein each one of the plurality of scanned documents has a different resolution. In one embodiment, each page of the document may be scanned at a highest resolution associated with the scanner. The rest of the scanned documents may be generated by converting the highest resolution scanned document into lower resolution scanned documents electronically.

In another embodiment, each page of the document may be scanned multiple times at the desired resolutions. The resolutions may be user defined via a GUI. In another embodiment, the resolutions may be set (e.g., two different resolutions for printing and display).

At block 510, the method 500 outputs the plurality of scanned documents. In one embodiment, where two resolutions are automatically selected, a first scanned document at a highest resolution may be stored for printing and a second scanned document at a lower resolution may be displayed.

In one embodiment, the plurality of scanned documents may be presented in a menu or GUI. A selection of a scanned document at a particular resolution may be received. The scanned document at the particular resolution that is selected may be output. For example, the scanned document may be printed, may be transmitted to an end point device via email, may be shown on the display of the MFD, and the like. At block 512, the method 500 ends.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for scanning a document a single time to generate a scanned image in different resolutions, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for scanning a document a single time to generate a scanned image in different resolutions (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for scanning a document a single time to generate a scanned image in different resolutions (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for scanning a document on a multi-function device (MFD) to generate a scanned image in different resolutions, comprising:

receiving, by a processor, a selection of a first workflow template to generate a plurality of scanned documents in different resolutions with a single scan request of the document on the MFD, wherein the different resolutions for each one of the plurality of scanned documents are user defined in the first workflow template, wherein a first one of the plurality of scanned documents in a first resolution of the different resolutions is to be printed and a second one of the plurality of scanned documents in a second resolution of the different resolutions is to be displayed on a monitor;

receiving, by the processor, the document;

causing, by the processor, a scanner to scan the document;

generating, by the processor, the plurality of scanned documents in the different resolutions, wherein the generating comprises:

causing, by the processor, the scanner to scan the document a first time at the first resolution; and causing, by the processor, the scanner to scan the document a second time at the second resolution;

outputting, by the processor, the plurality of scanned documents, wherein the outputting comprises:

storing, by the processor, the plurality of scanned documents in a file folder that includes a single icon for the plurality of scanned documents;

receiving, by the processor, a selection of the icon to print the document;

automatically selecting, by the processor, the first one of the plurality of scanned documents in the first resolution to be printed; and causing, by the processor, the first one of the plurality of scanned documents to be printed.

2. The method of claim 1, further comprising:
receiving, by the processor, a selection of a second workflow template to print one of the plurality of scanned documents;
presenting, by the processor, a menu of the plurality of scanned documents that presents an associated resolution of each one of the plurality of scanned documents;
receiving, by the processor, a selection of a scanned document of the plurality of scanned documents in the menu; and
printing, by the processor, the scanned document that is selected in the associated resolution.

3. The method of claim 1, further comprising:
presenting, by the processor, the first workflow template in a graphical user interface (GUI) of the MFD to generate the scanned image in different resolutions.

4. The method of claim 1, wherein the plurality of scanned documents is stored in a remotely located server coupled to a printing network of a plurality of different MFDs.

5. The method of claim 1, wherein the outputting comprises:
displaying, by the processor, a first one of the plurality of scanned documents in a first resolution; and
storing, by the processor, a second one of the plurality of scanned documents at a second resolution.

6. A non-transitory computer-readable medium storing a plurality of instructions, which when executed by a processor of a multi-function device (MFD), cause the processor to perform operations for scanning a document on a multi-function device (MFD) to generate a scanned image in different resolutions, the operations comprising:
receiving a selection of a first workflow template to generate a plurality of scanned documents in different resolutions with a single scan request of the document on the MFD, wherein the different resolutions for each one of the plurality of scanned documents are user defined in the first workflow template, wherein a first one of the plurality of scanned documents in a first resolution of the different resolutions is to be printed and a second one of the plurality of scanned documents in a second resolution of the different resolutions is to be displayed on a monitor;
receiving the document;
causing a scanner to scan the document;
generating the plurality of scanned documents in the different resolutions, wherein the generating comprises:
causing the scanner to scan the document a first time at the first resolution; and
causing the scanner to scan the document a second time at the second resolution;
outputting the plurality of scanned documents, wherein the outputting comprises:
storing the plurality of scanned documents in a file folder that includes a single icon for the plurality of scanned documents;
receiving a selection of the icon to print the document;
automatically selecting the first one of the plurality of scanned documents in the first resolution to be printed; and
causing the first one of the plurality of scanned documents to be printed.

7. The non-transitory computer-readable medium of claim 6, further comprising:
receiving a selection of a second workflow template to print one of the plurality of scanned documents;
presenting a menu of the plurality of scanned documents that presents an associated resolution of each one of the plurality of scanned documents;
receiving a selection of a scanned document of the plurality of scanned documents in the menu; and
printing the scanned document that is selected in the associated resolution.

8. The non-transitory computer-readable medium of claim 6, further comprising:
presenting the first workflow template in a graphical user interface (GUI) of the MFD to generate the scanned image in different resolutions.

9. The non-transitory computer-readable medium of claim 6, wherein the plurality of scanned documents is stored in a remotely located server coupled to a printing network of a plurality of different MFDs.

10. The non-transitory computer-readable medium of claim 6, wherein the outputting comprises:
displaying a first one of the plurality of scanned documents in a first resolution; and
storing a second one of the plurality of scanned documents at a second resolution.

11. A method for scanning a document on a multi-function device (MFD) to generate a scanned image in different resolutions, comprising:
receiving, by a processor, a selection of a first workflow template to generate a plurality of scanned images in different resolutions with a single scan request of the document on the MFD, wherein the different resolutions for each one of the plurality of scanned images are user defined in the first workflow template, wherein a first scanned image of the plurality of scanned images in a highest resolution of the different resolutions is to be printed and a second scanned image of the plurality of scanned images in a second resolution of the different resolutions that is lower than the highest resolution is to be displayed on a monitor;
receiving, by the processor, the document;
causing, by the processor, a scanner to scan the document;
generating, by the processor, the first scanned image at the highest resolution of the scanner;
converting, by the processor, the first scanned image into the second scanned image at the second resolution via a second scan of the document; and
storing, by the processor, the first scanned image and the second scanned image for display or printing in a file folder that includes a single icon for the for the first scanned image and the second scanned image;
receiving, by the processor, a selection of the icon to print the document;
automatically selecting, by the processor, the first scanned image in the first resolution to be printed; and
causing, by the processor, the first scanned image to be printed.

* * * * *